(12) United States Patent
Ogawa et al.

(10) Patent No.: US 7,460,065 B2
(45) Date of Patent: Dec. 2, 2008

(54) RTK-GPS SURVEYING SYSTEM

(75) Inventors: Kazuhiro Ogawa, Tokyo (JP); Kenichi Takasu, Tokyo (JP); Mitsuru Ogawa, Capelle a/d IJssel (NL)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 11/729,859

(22) Filed: Mar. 30, 2007

(65) Prior Publication Data

US 2007/0241961 A1    Oct. 18, 2007

(30) Foreign Application Priority Data

Mar. 31, 2006    (JP)    .............................. 2006-096813

(51) Int. Cl.
*G01S 5/14*    (2006.01)
(52) U.S. Cl. .............................. 342/357.08; 342/357.09
(58) Field of Classification Search ............ 342/357.03, 342/357.06, 357.08, 357.09, 357.1; 701/213, 701/215
See application file for complete search history.

(56) References Cited

U.S. PATENT DOCUMENTS 6,185,427 B1 *  2/2001  Krasner et al. ........... 455/456.2
6,661,372 B1 * 12/2003  Girerd et al. ............ 342/357.12
2005/0105519 A1 *  5/2005  Koppol ...................... 370/386
2006/0182055 A1 *  8/2006  Coffee et al. ................ 370/328

FOREIGN PATENT DOCUMENTS

JP    2002-311124 A    10/2002

* cited by examiner

*Primary Examiner*—Dao L Phan
(74) *Attorney, Agent, or Firm*—Foley & Lardner LLP

(57) ABSTRACT

An RTK-GPS surveying system for surveying an object includes at least one satellite positioning device as a base station configured to send correction data, a plurality of satellite positioning devices as rover stations configured to receive the correction data, and a server provided in an IP-VPN communication network for establishing communication between the satellite positioning device as the base station and the plurality of satellite positioning devices as the rover stations, each of the satellite positioning devices has a satellite positioning part for receiving radio wave from a satellite, a communication part for performing communication between each of the satellite positioning devices, and a control part for controlling the satellite positioning part and the communication part.

8 Claims, 5 Drawing Sheets

11,12,13
SATELLITE POSITIONING PART,
COMMUNICATION PART,
CONTROL PART

RTK-GPS SURVEYING SYSTEM

CROSS-REFERENCE TO THE RELATED APPLICATION

The present application is based on and claims priority from Japanese Patent Application No.2006-96813 filed on Mar. 31, 2006, the disclosure of which is hereby incorporated by reference herein in its entirety.

BACKGROUND

The present invention relates to an RTK(real-time kinematic)-GPS(global positioning system) surveying system for sending and receiving a control command and correction data by using a network and a surveying server and a surveying terminal device for use in the RTK-GPS surveying system.

A kinematic positioning system is known as one of interferometric positioning systems for obtaining relative positional relationship between two observation stations with high accuracy by using a positioning satellite such as a GPS (refer to JP2002-311124A).

In this kinematic positioning system, one observation point as a known reference point and another observation point as an unknown observation point are used. The relative positional relationship between the two observation points is obtained with high accuracy by simultaneously receiving radio waves from the satellite such as a GPS with observation stations placed at both of the observation points, so as to obtain the position coordinates of the unknown observation point from the position coordinates of the known reference point with high accuracy. In this kinematic positioning system, the position coordinates are obtained by later analyzing the signals recorded at the observation points.

As an improvement of this kinematic positioning system, a real-time kinematic positioning system (hereinafter, referred to as RTK positioning system) is known.

In this RTK positioning system, one of two observation stations is placed as a fixed point at an observation point as a reference point having known position coordinates, so as to send observation data to a rover station, and the other observation station is placed as the rover station at an observation point having unknown position coordinates, so as to receive the positioning satellite signals and the observation data sent from the base station. The position coordinates of the rover station are measured in real time by receiving the positioning satellite signals and the observation data while performing an analysis process.

Figure 1:
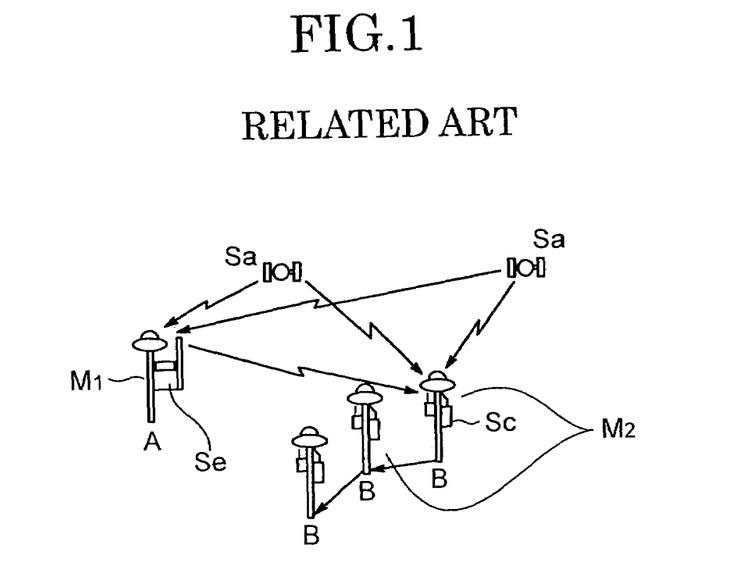
FIG. 1 is an explanatory view illustrating one example of a conventional RTK positioning system.

More particularly, in the RTK positioning system, as illustrated in FIG. 1, at first, a base station M1 is disposed at an observation point A as a reference point having known position coordinates, and also rover stations M2 are disposed at observation points B as unknown points each having unknown position coordinates. After the measurement of position coordinates is finished, the rover station M2 is moved to a next observation point (survey point) as an unknown point having unknown position coordinates as needed. The base station M1 and the rover station M2 receive the positioning satellite signals (radio waves) from a satellite Sa and the rover station M2 refers to the base station M1. At the same time, the rover station M2 performs an analysis process in real time, so as to sequentially obtain the position of observation point B as an unknown point.

In this RTK positioning system, a range in which the rover station M2 can refer to a specific base station M1 (hereinafter, referred to as a base station reference range) is a range of about 10 km in radius from the center of base station M1.

This is because, if the distance between the base station M1 and the rover station M2 is increased, the effects of the differences between the ionosphere and the troposphere at the observation point become can not be ignored, resulting in the deterioration in the measuring accuracy.

On the other hand, in order to refer to the correction data of the base station M1 by the rover station M2, it is necessary to send the correction data from the base station M1 to the rover station M2. For this sending, a device for wirelessly sending the correction data having a particular frequency from the base station M1 is used. Therefore, the base station M1 includes a sending device, for example, a transmitter Se having a frequency of about 400 MHz and an output of 10 mW for constantly sending the correction data. The rover station M2 includes a wireless receiver Sc capable of receiving the radio waves from the transmitter Se for referring to the sent correction data.

Figure 2:
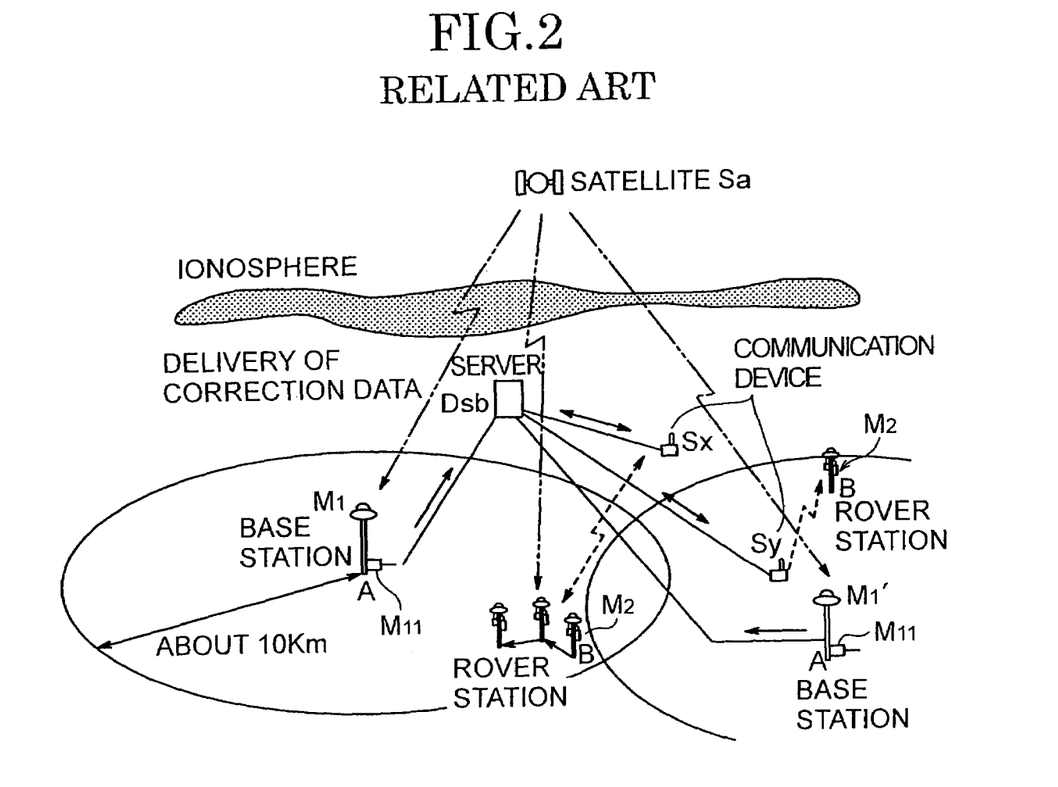
FIG. 2 is a view explaining defects of the conventional RTK positioning system.

Moreover, as illustrated in FIG. 2, a satellite positioning system using a satellite positioning data server Dsb as a medium for sending and receiving data is known.

At least one rover station M2, a plurality of base stations M1, M1' and communication devices Sx, Sy for establishing the communication between the rover station M2 and the base stations M1, M1' are connected to the satellite positioning system via the GPS positioning data server Dsb.

In this satellite positioning system, the base stations M1, M1' are generally fixed in positions each having known position coordinates. The base stations M1, M1' constantly or periodically receive the radio waves from the satellite Sa, so as to obtain the correction data regarding the arrangement positions of the base stations M1, M1'.

The measured correction data is constantly or periodically sent to the GPS positioning data server Dsb from the base station M1 by the communication device. Accordingly, the base stations M1, M1' are required to be fixed in the known positions and to communicate the correction data at high speed. Therefore, the communication device is used by a private line such as WAN constantly connected thereto.

Incidentally, the frequency to be used for sending the correction data in the case of wirelessly delivering the correction data is set such that the frequency of the base station M1 is different from the frequency of the base station M1'. This is because, if the borderlines of the wireless access range are adjacent to each other, it is difficult to distinguish the base station in the periphery of the borderline, causing miss-measurement. Also, if parts of the wireless access ranges overlap each other, interference is caused in the overlapped area. In this case, the two base stations M1, M1' are used, but three base stations or more can be used.

As described above, if there is a plurality of base stations (for example, M1, M1'), the wireless transmitters M11 are set to different frequencies. The receiving frequency of the rover station M2 should therefore be adjusted depending on the base station to be used. Generally, M1, M1' . . . to be used as the base station is selected by referring to a survey work plan, and the frequency of a base station to be used is found out before the survey work, so as to adjust the receiving frequency of the rover station. Accordingly, if the rover station M2 is moved to another base station (for example, M1') reference range beyond the base station (for example, M1) reference range, it is necessary for the rover station M2 to refer to a different base station M1, M1', . . . .

Therefore, it is disadvantageous to perform surveying work while constantly recognizing the relationship between the actual position of the own rover station M2 and the position of the base station (M1, M1' or the like).

It is also inconvenient to select a base station, which can be used for RTK surveying and has a preferable receiving condition of the satellite Sa, from the correction data delivered from the base stations M1, M1' . . . according to a condition such as the number of common satellites between the base station and the rover station, so as to appropriately set the receiving frequency depending on the base station selected by a measurer.

Moreover, in the case of using wireless communication, the communication is limited to one-way communication from the base stations M1, M1' . . . to the rover station M2, so it is disadvantageous because the two-way sending and receiving of data which confirms the condition of the rover station M2 from the base station M1, for example, can not be performed.

Furthermore, in the case of using the Internet, there is a possibility of receiving access being unauthorized for use of a line.

Additionally, in the case of operating the communication via a network, it is necessary to use a static address for determining a communication partner. However, in the case of using a static IP address, the number of addresses is limited and also the cost for obtaining the IP address is very expensive. In the case of using a general provider, since a usable IP address is dynamic, an IP address is changed with each access. Therefore, the IP address has a disadvantage in that it can not be used as a static IP address for defining a partner, when connecting to a selected partner.

Since a specific ID is only required in an IP-VPN (Internet Protocol-Virtual Private Network), a specific number such as a machine's ID is used as an address to designate an access point.

Since an indirect observation method according to the public surveying operation manual using RTK-GPS (technical data of Geographical Survey Institute, A.1-No. 228 June, H12, http://psgsv.gsi.go.jp/koukyou/rtk_manual/htm/mokuji.htm) requires correction data delivery from one point of a base station to two points of rover stations, it has a disadvantage in that it can not operate by means of a cellphone line.

Accordingly, there is a need for an RTK-GPS surveying system which can simultaneously access one base station from a plurality of rover stations while preventing illegal access without physically providing a private line and can prohibit access from a different group.

SUMMARY

One aspect of the present invention relates to an RTK-GPS surveying system for surveying an object including at least one satellite positioning device as a base station configured to send correction data, a plurality of satellite positioning devices as rover stations configured to receive the correction data, and a server provided in an IP-VPN communication network for establishing communication between the satellite positioning device as the base station and the plurality of satellite positioning devices as the rover stations, each of the satellite positioning devices including a satellite positioning part for receiving radio waves from a satellite, a communication part for performing communication between each of the satellite positioning devices, and a control part for controlling the satellite positioning part and the communication part, wherein each of the communication parts has a specific ID assigned for each of the satellite positioning devices, wherein the server includes the specific ID of each of the communication parts registered for each of the satellite positioning devices, and wherein the server verifies the specific ID registered in the server and the specific ID registered in each of the satellite positioning devices, and allows login to the IP-VPN communication network, so as to establish the communication between the satellite positioning device as the rover station and the satellite positioning device as the base station.

Preferably, a plurality of specific IDs of the satellite positioning devices as the base stations is registered in the server, the control part of each of the satellite positioning devices as the rover station includes a selection device configured to select the specific ID of the satellite positioning device used as the fixed device, and one of the satellite positioning devices as the fixed devices is selectable by an operation of the control part from the satellite positioning device as the rover station.

Advantageously, the satellite positioning devices including the base station and the rover station are adopted as a group, the control part of each of the satellite positioning devices includes the specific ID of another satellite positioning device belonging to the group and the control part of each of the satellite positioning devices is communicable within a range of the group.

In a preferred embodiment, a plurality of satellite positioning devices used as the rover stations is provided in the IP-VPN communication network, the control part of one of the satellite positing devices used as the rover station includes an instruction portion for sending an instruction from a beginning to an end of observation to another rover station and the control part of the another rover station includes an alarm portion for informing the instruction from the instruction portion, so as to perform surveying by means of an indirect observation method which performs simultaneous measurement by using at least two satellite positioning devices used as the rover stations.

Advantageously, the control part of each of the satellite positioning devices includes firmware for executing a function of the control part, the IP-VPN communication network includes a central terminal device configured to update the function of the control part, and each of the satellite positioning devices accesses the central terminal device, so as to update the firmware online.

Preferably, each of the satellite positioning devices is accessible to the central terminal device via the server.

In a preferred embodiment, the IP-VPN communication network includes a central analysis process device configured to analyze data obtained by each of the satellite positioning devices online.

Advantageously, a specific ID of the central analysis process device is registered in the server, and each of the satellite positioning devices establishes communication with the central analysis process device via the server.

DESCRIPTION OF THE PREFERRED EMBODIMENTS

Hereinafter, preferred embodiments of the present invention will be explained with reference to the drawings.

EMBODIMENTS

Embodiment 1

Figure 3:
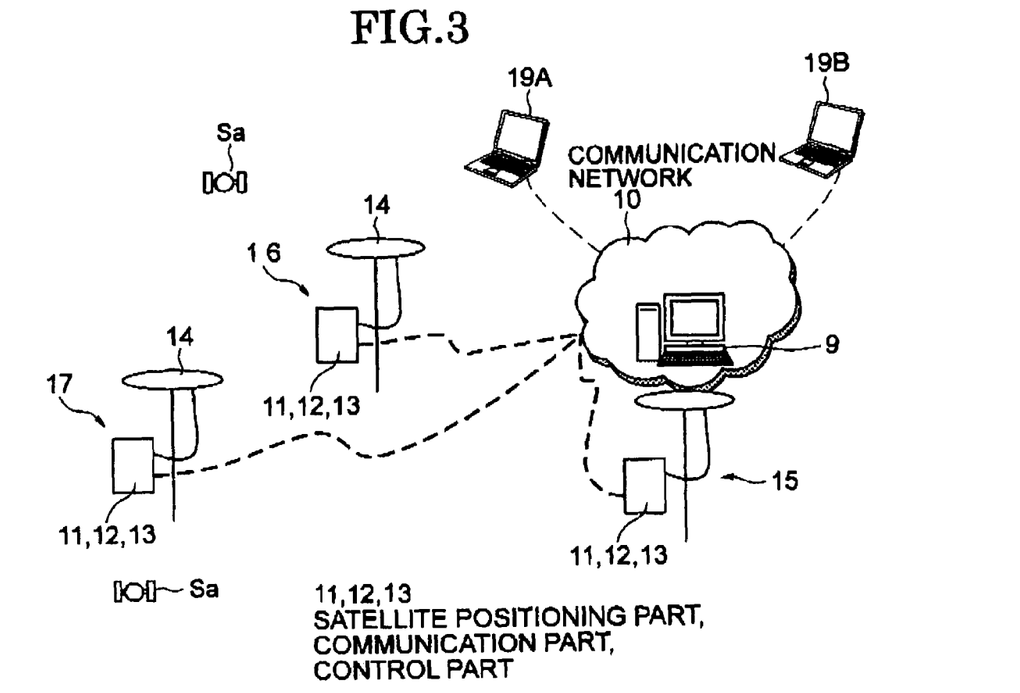
FIG. 3 is an explanatory view showing one example of an RTK-GPS surveying system according to the present invention.

FIG. 3 shows an entire structural view illustrating a general description of one embodiment of an RTK-GPS (Real-time Kinematic-Global Positioning System) surveying system according to the present invention.

This satellite surveying system includes a plurality of observation stations as satellite positioning devices capable of performing the RTK-GPS surveying and one server 9, which are provided in a communication network 10.

At least one observation station is used as a base station for sending correction data for a positioning analysis process and at least another observation station is used as a rover station for receiving the correction data.

Figure 4:
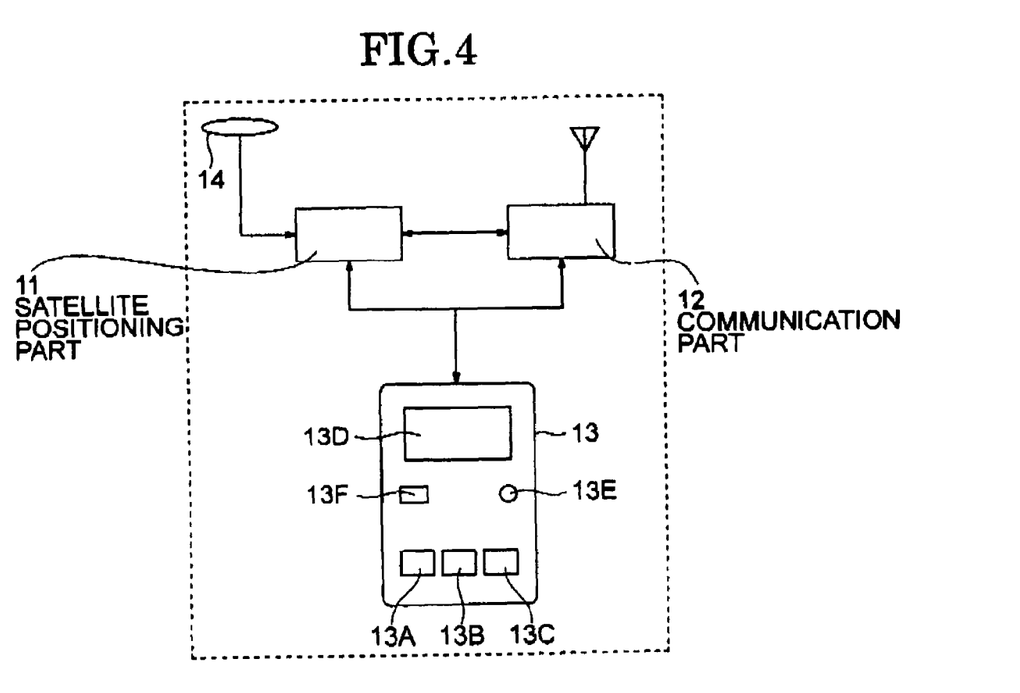
FIG. 4 is a schematic view showing one example of a structure of a satellite positioning device for use in the RTK-GPS surveying system according to the present invention.

Referring to FIG. 4, each of the observation stations includes a satellite positioning part 11, a communication part 12 and a control part 13. The satellite positioning part 11 obtains its own position coordinates by receiving radio waves from a satellite Sa. The communication part 12 performs communication between the observation stations. The control part 13 controls the satellite positioning part 11 and the communication part 12. In FIGS. 3, 4, reference number 14 denotes a GPS (Global Positioning System) antenna for receiving the radio waves from the satellite Sa.

The control part 13 includes a communication button 13A, a switching button 13B, an instruction button 13C and a display part 13D. In addition, the display part 13D may include a function switching button. The function switching button may be displayed on the display part 13D by a firmware function provided in the control part 13, and the switching can be thereby performed.

A handheld PC (personal computer) or the like is used for this control part 13. The control part 13 includes a function for setting and controlling a GPS receiver of the satellite positioning part 11, a function for setting and controlling the communication part 12 or the like.

The satellite positioning part 11 generally performs a position analysis while using four satellites Sa, but it is not limited thereto.

The communication part 12 includes a function for sending the correction data in CMR format, which is a combination of the received data from the satellite Sa and the known position coordinates, by means of packet communication.

The satellite positioning part 11, communication part 12 and control part 13 are integrated so to be downsized.

Referring to FIG. 3, three observation stations are disposed. In this case, one of the observation stations is used as a base station 15 and the other two observation stations are used as rover stations 16, 17.

Each of the satellite positioning parts 11 fulfills a role of obtaining its own position coordinates by receiving radio waves from the satellite Sa. The communication part 12 fulfills a role of performing communication of the observation stations via the server 9.

A specific ID is assigned to each of the communication parts 12 for each of the observation stations. The specific ID of each of the communication parts 12 is registered in the server 9 for each of the observation stations. The server 9 has a main function of registering and authenticating the specific IDs.

In this case, the communication network 10 is IP-VPN (Internet Protocol-Virtual Private Network). Each of the communication parts 12 is a cell-phone as a wireless sending and receiving device. The specific ID is a cell-phone number, but it may be a number of a specific device for each of the observation stations.

Each of the communication parts 12 is connected to the communication network 10 via an IP communication network. In the case of using the cell-phone, each of the communication parts 12 is connected to the IP-VPN by using a network card for a cell-phone line. In this case, the IP-VPN is a public technology which is a service capable of using a public line just like a private line. More particularly, the IP-VPN is a VPN constructed via a wide-area IP communication network of a telecommunication carrier. By going through the IP-VPN, a remote network can be operated as well as connecting the remote network by a LAN, and a protected virtual private line can be constructed by using an authentication technology, a cryptographic technology or the like, even the Internet.

The server 9 has a function of establishing communication between the base station 15 and at least one of the rover stations 16, 17.

The sever 9 fulfills roles of delivering packet data as the correction data, sending a control command, authenticating a login ID and observing the communication network 10.

Figure 5:
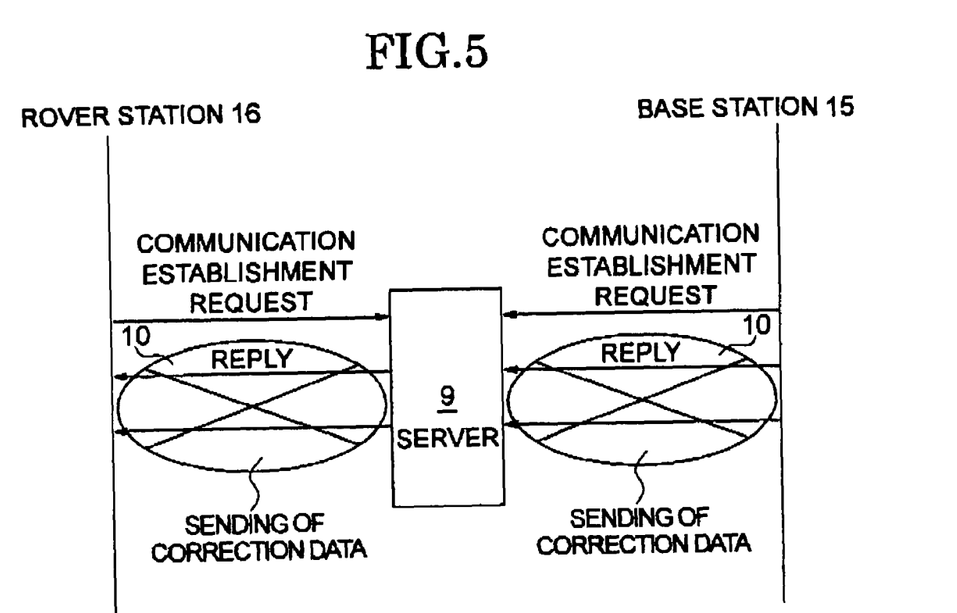
FIG. 5 is a schematic view showing one example of communication by the RTK-GPS surveying system according to the present invention.

Referring to FIG. 5, in the RTK-GPS surveying system, if a communication establishing request (communication partner's specific ID) is sent to the server 9 from the rover station 16 via the communication network 10 by the operation of the communication button 13A, the server 9 authenticates the specific ID of the rover station 16, which is the communication source, to allow the login of the rover station 16 while the server 9 searches for the specific ID of the base station 15, which is the communication partner, so as to establish communication between the rover station 16 and the base station 15.

Similarly, if the communication establishing request (communication partner's specific ID) is sent to the server 9 from the rover station 17 via the communication network 10, the server 9 authenticates the specific ID of the rover station 17, which is the communication source, to allow the login of the rover station 17 while the server 9 searches the specific ID of the base station 15, which is the communication partner, so as to establish the communication between the rover station 17 and the base station 15.

With communication between the rover station 16 and base station 15 established, if the rover station 17 accesses the server 9, the server 9 establishes communication between the rover station 17 and the base station 15, with communication between the rover station 16 and the base station 15 being maintained. Accordingly, the correction data is sent to the rover stations 16, 17 with a time-sharing system by the packet communication.

According to the RTK-GPS surveying system, one base station 15 and a plurality of rover stations 16, 17 can be used at the same time; thus, the convenience of the surveying system is improved.

In addition, the communication speed and also the security can be improved by using the IP-VPN.

In embodiment 1, one base station 15 is disposed in the communication network 10. However, if a selection device 13E capable of selecting a base station 15 is provided in the control part 13 of the observation station used as the rover station 16, 17, a specific base station 15 can be selected from a plurality of base stations 15, each having a specific ID registered in the server 9, disposed in the communication network 10.

Hereinafter, one example of an RTK operation procedure will be explained.

(1) The initialization and setting of the base station are performed.

According to the general operation procedure of RTK surveying, the observation station is disposed at the reference point, so as to perform the base station setting operation.

The login to the communication network 10 is performed, and the access to the communication network 10 is carried out via the communication part 12 connected to the satellite positioning part 11 of the base station, in order to receive authentication by the server 9.

In this case, the server 9 of the communication network 10 executes authentication by using the specific ID of the communication part 12, so as to determine the access availability.

If the setting of the base station and the login to the communication network 10 are completed, the delivery of correction data is started according to the request through the communication network 10.

(2) The initialization and setting of the rover station are conducted.

Next, according to the general operation procedure of RTK surveying, the rover station is disposed at a survey point having unknown position coordinates, so as to perform the rover station initialization operation.

The rover station is disposed at the observation point based on a measurement planning, so as to perform independent positioning while receiving the radio waves from the satellite Sa. The position coordinate information obtained by this independent positioning generally includes an error of about 20-100 m.

Next, the login to the communication network 10 is carried out, and the access to the communication network 10 is performed via the communication part 12 connected to the satellite positioning part 11 of the rover station, in order to receive the authentication by the server 9. In this case, the server 9 of the communication network 10 performs authentication by using the specific ID of the communication part 12, so as to determine the access availability.

(3) If the setting of rover station and the login to the communication network 10 are completed, the base station capable of delivering the correction data through the communication network 10 is displayed on the display portion 13D of the control part 13 of the rover station. A survey worker of the rover station selects the observation station to be used as the base station from a plurality of observation stations displayed on the display portion 13D.

The correction data of the base station selected by the rover station is delivered to the rover station through the communication network 10 via the server 9.

(4) The rover station receives the correction data of the base station required through the server 9, and corrects the error by performing the analysis by the analysis process device of the control part 13 with the received data, so as to obtain accurate positional information.

(5) By this correction, a positioning accuracy of about 10 mm can be obtained. The obtained result is recorded in the data memory of the control part 13 equipped with the rover station. The recorded result is used for a process such as map creation in another place after the operation is completed.

Moreover, as shown in FIG. 3, the communication network 10 is equipped with a central analysis process device (central terminal device) 19A for analyzing online the positioning data obtained by each of the satellite positioning devices used as the rover station. A specific ID is assigned to the central analysis process device 19A, so as to register the specific ID in the server 9. Communication between the central analysis process device 19A connected to the communication network 10 and the rover station is therefore established via the server 9. The positioning data obtained by the static observation using the rover station is sent to the central analysis process device 19A via the server 9, and the positioning data is analyzed by the central analysis process device 19A. The basic line analysis process can be thereby performed.

By equipping the central analysis process device 19A in the communication network 10, the basic line analysis can be performed without bringing back the observation devices such as the satellite positioning part 11, communication part 12 and control part 13 constituting each of the rover stations from the surveying site to an office so as to download the positioning data into a PC.

Moreover, the communication network 10 is equipped with a central terminal device 19B for updating a firmware which performs the functions of the control part 13. The specific ID of the central terminal device 19B is assigned, so as to register the specific ID to the server 9. Communication between the central terminal device 19B connected to the communication network 10 and each of the observation stations is therefore established via the server 9. By equipping the central terminal device 19B in the communication network 10, the firmware of the control part 13 of each of the observation stations can be upgraded. Moreover, a structure for upgrading the firmware of the satellite positioning part 11 or a structure for upgrading the firmware of the communication part 12 can be adopted.

(6) A computation portion for computing a distance between the rover station and the base station can be provided in the control part 13 of the rover station, so as to constantly compute the distance from the rover station to the base station during the measurement, thus obtaining the direct distance from the rover station to the base station. If the base station having a direct distance shorter than the above straight distance from the rover station to the base station that the communication has presently established is presented in the communication network 10, the base station that the communication is presently established with respect to the rover station is changed to the base station having the shorter direct distance. After that, the communication between the rover station and that base station is established such that the rover station receives the correction data from the new base station.

(7) In addition, if the receiving conditions of radio waves from the satellite Sa and the base station that the communication has presently established with respect to the rover station for delivering the correction data deteriorate, taking the acquisition condition of the satellite Sa of the base station (the number of satellites Sa, the arrangement position of satellite Sa and the radio wave noise from the satellite Sa (S/N)) and the direct distance from the base station to the rover station, new communication is established between the rover station and another new base station. If the correction data is delivered from the new base station to the rover station, the rover station can receive the correction data from the closest base station having a preferable radio wave receiving condition.

(8) Without automatically switching communication between one rover station and the base station that the communication has established to that rover station to the communication between the rover station and another new base station, an annunciation device can be provided in each of the control parts 13, so as to inform the change in the base station to a worker of the rover station by means of an alarm. In this case, the number of observation stations which can be used for the surveying operation is displayed on the display portion of the control part 13, so as to inform the number of observation stations to the worker.

Embodiment 2

Figure 6:
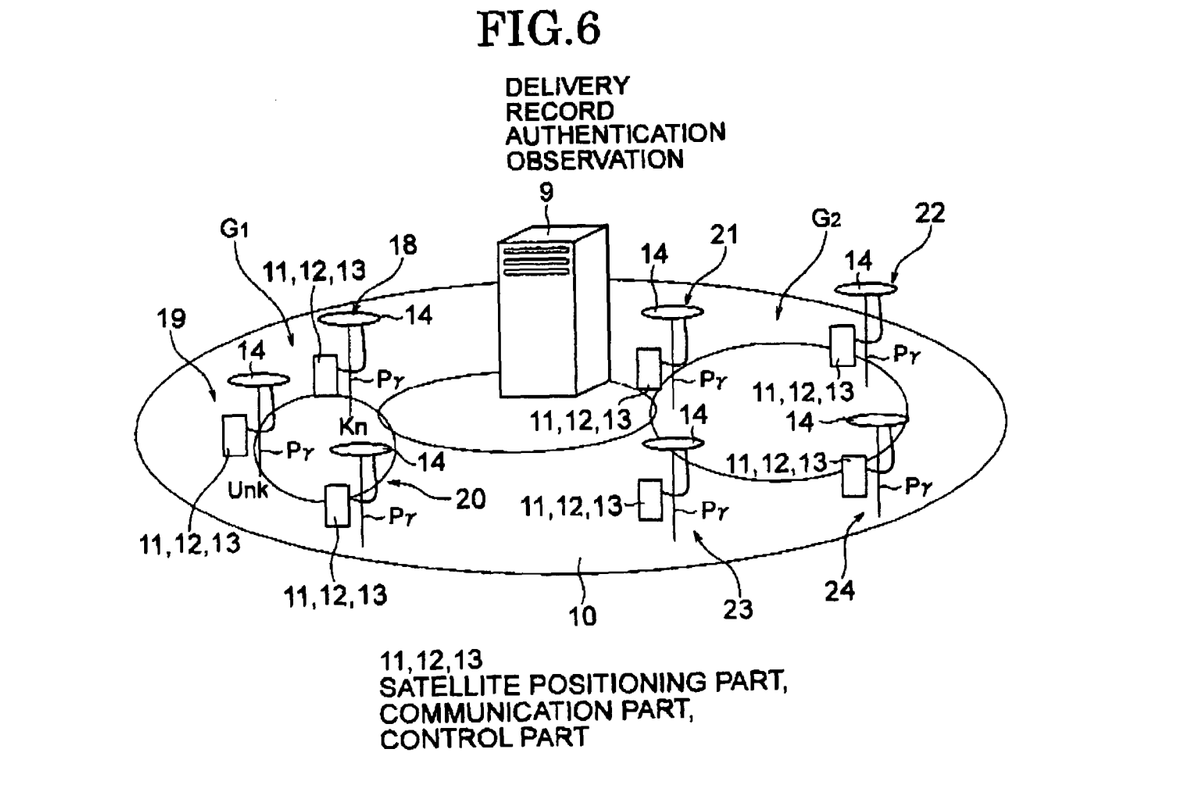
FIG. 6 is a schematic view showing another example of communication by the RTK-GPS surveying system.

FIG. 6 shows a situation in which a plurality of surveying groups exists in the communication network 10. Reference number G1 shows a surveying operation group of one company and reference number G2 shows a surveying operation group of another company.

The group G1 includes one base station 18 and two rover stations 19, 20, for example. The group G2 includes two base stations 21, 22 and two rover stations 23, 24, for example.

A control part 13 of each of satellite positioning devices has a specific ID registered in the server 9 for each of the groups. For example, the specific ID of the base station 18 of the group G1 is "ID 11", the specific ID of the rover station 19 of the group G1 is "ID 12", the specific ID of the rover station 20 of the group G1 is "ID 13", the specific ID of the base station 21 of the group G2 is "ID 21", the specific ID of the base station 22 of the group G2 is "ID 22", the specific ID of the rover station 23 of the group G2 is "ID 23" and the specific ID of the rover station 24 of the group G2 is "ID 24".

"ID 11, ID12, ID 13, ID 21, ID 22, ID 23 and ID 24" are registered in the server 9.

Figure 7:
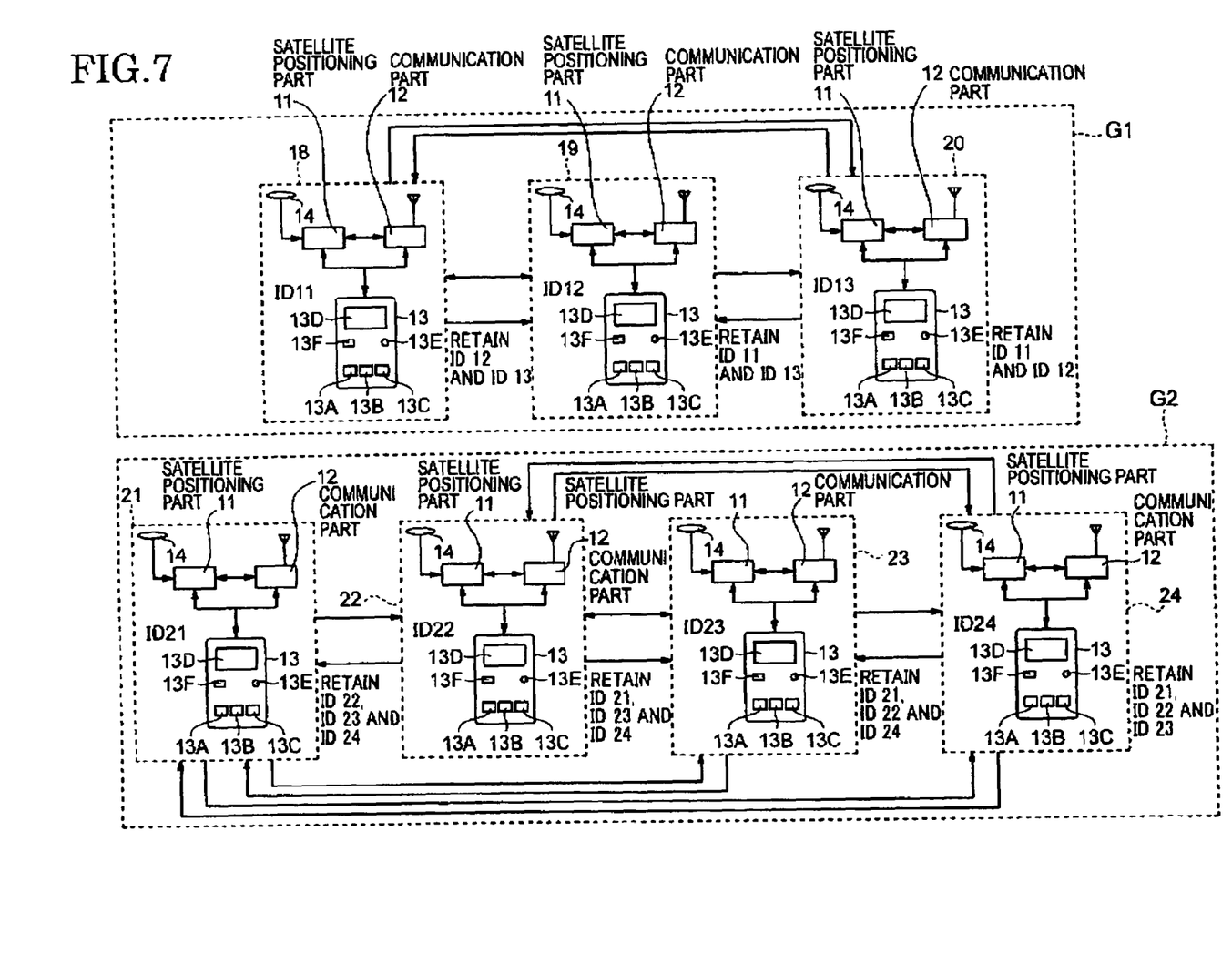
FIG. 7 is a view explaining a communicable state of each of groups.

The control part 13 of each of the observation stations includes an input portion 13F for inputting the specific IDs as shown in FIG. 3. A worker in each of the groups can register the specific ID into the control part 13 by using the input portion 13F For example, as shown in FIG. 7, the control part 13 of the base station 18 of the group G1 retains "ID 12" and "ID 13", the control part 13 of the rover station 19 of the group G1 retains "ID 11" and "ID 13", the control part 13 of the rover station 20 of the group G1 retains "ID 11" and "ID 12", the control part 13 of the base station 21 of the group G2 retains "ID 22", "ID 23" and "ID 24", the control part 13 of the base station 22 of the group G2 retains "ID 21", "ID 23" and "ID 24", the control part 13 of rover station 23 of the group G2 includes "ID 21", "ID 22" and "ID 24" and the control device 13 of the rover station 24 of the group G2 has "ID 21", "ID 22" and "ID 23". Communication among the base station 18, the rover station 19 and the rover station 20 via the server 9 thereby becomes available for the group G1. Communication among the base station 21, the base station 22, the rover station 23 and the rover station 24 via the server 9 thereby becomes available for the group G2. Communication between the group G1 and the group G2 is not permitted.

Therefore, the security is protected even if a plurality of groups is in the communication network 10.

In this case, for example, if the rover station 19 can not receive the correction data of the base station 18 of the group G1 because of radio disturbance or the like, it is necessary to correctly obtain the specific ID of the base station 21 of the group G2 by inquiring about the specific ID of the base station 21 of the group G2, for example, so as to register the specific ID of the base station 21 of the group G2 in the control part 13 of the rover station 19. The rover station 19 can thereby receive the correction data from the base station 21 of the group G2.

By providing a public status, the base station data can be delivered to all of the rover stations regardless of the inside and outside of the group.

According to this embodiment of the present invention, a flexible surveying system can be constructed by easing the maintenance required for security protection in emergency situations while constantly maintaining security protection.

In this case, the control part 13 of each of the observation stations includes a rover station function executing program for executing the functions of the rover station and a base station function executing program for executing the functions of the base station. The switching button 13B (reference to FIG. 4) functions as a switching device for conducting switching between the functions of the base station and the functions of the rover station from one observation station to another observation station.

For example, each of the control parts 13 of the base station 18 and the rover stations 19, 20 belonging to the group G1 includes the rover station function executing program and the base station function executing program for executing the function of the base station and also includes a switching device.

For example, when switching the functions of the rover station 19 to the functions of the base station from the rover station 20, communication between the rover station 20 and the base station 18 is established via the server 9. The switching instruction which switches the rover station function executing program to the base station function executing program of the control part 13 of the rover station 19 is sent to the rover station 19 by the operation of the switching device of the control part 13 of the rover station 20. The functions of the control part 13 of the rover station 19 are changed to the base station function executing program by receiving the instruction. After that, the rover station 10 is thereby used as the base station.

In addition, for example, when switching the functions of the base station 18 to the functions of the rover station from the rover station 20, the communication between the rover station 20 and the base station 18 is established via the server 9. The switching instruction which switches the base station function executing program of the control part 13 of the base station 18 to the rover station function executing program is sent to the base station 18 by the operation of the switching device of the control part 13 of the rover station 20. The functions of control part 13 of the base station are thereby changed to the rover station function executing program by receiving the instruction. After that, the base station is accordingly used as the rover station.

In this embodiment, the functions of the observation station are switched from one observation station by the communication, but the mobile functions and the fixed functions can be switched by their own switching devices.

As described above, if the functions of the observation station can be switched between the functions of the base station and the functions of the rover station, the functions of the satellite positioning part can be switched to the functions of the base station or the functions of the rover stations in accordance with the intended operation. More particularly, the observation station which is set to operate as the base station is disposed at a reference point Kn having known coordinates, and the leveling is preciously performed as much as possible, so as to dispose the observation point by using a tripod or the like.

On the other hand, the observation station which is set to operate as the rover station is disposed at a measurement point UnK having unknown coordinates, and the GPS antenna 14 is attached to a pole Pr provided with a bubble tube or the like, such that the observation station is disposed so as to be capable of leveling in the measurement point UnK and transferring to the next measurement point UnK.

More particularly, the lower end of the pole Pr is placed in the measurement point UnK to maintain the pole Pr in a vertical state by a bubble tube or the like, and thereby the GPS antenna 14 can be precisely disposed in the measurement point Unk.

As described above, for example, one desired observation station having the functions of the rover station can be selected via the server so as to be switched to the observation station having the functions of the base station by means of the control part 13 of one observation station.

For example, by the control part 13 of the observation station which functions as the rover station, the observation stations which function as other rover stations of the communication network 10 are confirmed, and one specific observation station is set to the base station when a plurality of observation stations which function as the rover stations are available.

The observation station which functions as the base station can deliver the correction data to another rover station through the server 9 disposed in the communication network 10.

Next, the coordinates of the known point that the observation station has set as the base station are set to the observation station switched to the base station.

Since the above functions are provided in each of the observation stations, the switching between the functions of the base station and the functions of the rover station of another observation station can be remotely operated by establishing communication via the communication network 10.

More particularly, when the observation station as the satellite positioning device which is used as the rover station comes close to the next reference point, the observation station of this rover station is disposed in the reference point, thus switching the functions of the observation station from the functions of the rover station to the functions of the base station. Therefore, the observation station can be used as the base station, and thus the setting of the observation station disposed at the reference point can be performed from the rover station disposed at an unknown measuring point removed from the reference point by using the nearer equipments, allowing effective arrangement of the equipment and workers.

According to the present embodiment, even though a plurality of groups can login to the communication network 10, the presence of the observation stations belonging to one group registered in the server 9 is generally hidden relative to the observation stations belonging to another group different from that group. Therefore, the security can be protected among each of the groups.

Embodiment 3

Figure 8:
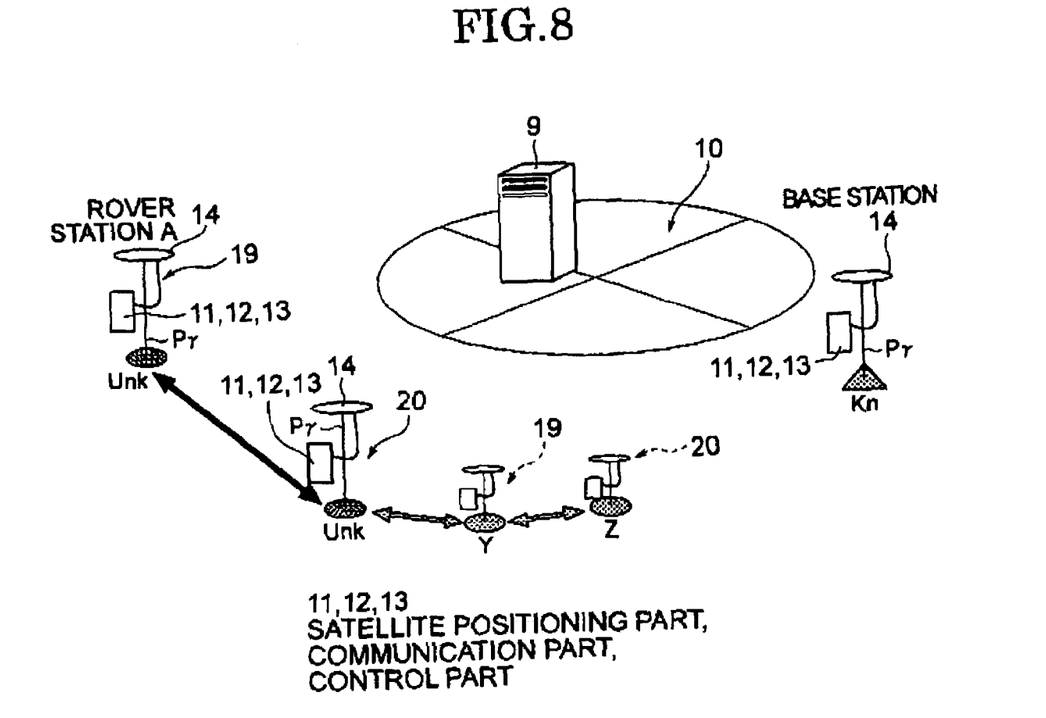
FIG. 8 is an explanatory view showing one example when performing indirect observation using the RTK-GPS surveying system according to the present invention.

FIG. 8 is a view explaining a surveying operation by an RTK indirect observation method.

In this case, the indirect observation method is one of the RTK-GPS surveying operations described in "Public Surveying Operation Manual using RTK-GPS" (technical data of Geographical Survey Institute, A•1-No.228 June, H12), which obtains relative positional relationship between a main rover station and a sub-rover station by using an observation basic line based on the position coordinates of the base station and the main rover station and the position coordinates of the base station and the sub-rover station obtained by simultaneously observing the base station and two rover stations (main rover station and sub-rover station).

The control part 13 of one rover station 19 used as the main rover station includes the instruction button 13C for inputting instructions from the beginning to the end of the observation with respect to another rover station 20 used as the sub-rover station. The control part 13 of another rover station 20 includes the display portion 13D which functions as the alarm portion for sending the instruction from the instruction button 13C. This instruction is sent from the main rover station to the sub-rover station via the server 9 disposed in the communication network 10.

If the base station is selected in the main rover station which logs-in the communication network 10, the sub-rover station is set to the base station in cooperation with the base station.

Previously, each of the surveying points required a worker for timing the start and the end of the observation between the main rover station and the sub-rover station by calling out to each other if the main rover station and the sub rover station were available within hearing distance, or for timing the start and the end of the observation between the main rover station and the sub-rover station by making contact with each other by means of a cell-phone or the like to adjust the watches. However, by operating the sub-rover station in cooperation with the operation from the main rover station, if one skilled person of the control part 13 is staffed in the main rover station, the worker in the sub-rover station can dispose, stop and move the equipment in accordance with the instructions displayed on the alarm portion of the control part 13 of the sub-rover station.

The main rover station instructs the surveying timing, receives and stores the surveying result data, computes and performs the map creation process of the surveying position coordinates, determines the success and failure of the surveying operation, and sends the determination result to the sub-rover station via the communication network 10. The process and the analysis of the main rover station are conducted by the control part 13 provided in the main rover station.

The RTK-GPS surveying system according to the embodiments of the present invention has the following effects.

According to one embodiment of the present invention, a plurality of rover stations can access one base station so as to simultaneously receive correction data in a packet communication format from the base station, while preventing unauthorized access without physically disposing a dedicated line.

According to one embodiment of the present invention, one of the base stations can be selected from the rover station side.

According to one embodiment of the present invention, since a specific IP address can be used in IP-VPN, each of the satellite positioning devices which logs-in to the communication network can be managed for each of the groups, and thus the security can be protected among each of surveying companies, for example.

According to one embodiment of the present invention, in the indirect observation method by "Public Surveying Operation Manual using RTK-GPS" (technical data of Geographical Survey Institute, A•1-No.228 June, H12, http://psgsv.g-si.go.jp/koukyou/rtk_manual/htm/mokuji.htm), it is required that the correction data be delivered from one base station to two rover stations. Such an operation can not be performed by a cell-phone line. However, according to one embodiment of the present invention, each of the satellite positioning devices used as the rover station can use one satellite positioning device as the base station, and also communication between each of the registered rover stations can be established. Accordingly, simultaneous observation can be performed by using at least two rover stations.

According to one embodiment of the present invention, the firmware of the communication part of each of the satellite positioning devices can be easily upgraded.

According to one embodiment of the present invention, the surveying operation can be accurately performed without having a skilled person at each of the base stations and each of the rover stations.

Although the present invention has been described in terms of an exemplary embodiment, it is not limited thereto. It should be appreciated that variations may be made in the embodiments described by persons skilled in the art without departing from the scope of the present invention as defined by the following claims. In addition, the number, position, shape, or the like of the components are not limited to the above embodiments, and can be changed to the number, position, shape or the like of components preferable for conducting the present invention. Moreover, no element or component in the present disclosure is intended to be dedicated to the public regardless of whether the element or component is explicitly recited in the following claims.

What is claimed is:

1. An RTK-GPS surveying system for surveying an object, comprising:

at least one satellite positioning device as a base station configured to send correction data;

a plurality of satellite positioning devices as rover stations configured to receive the correction data; and a server provided in an IP-VPN communication network for establishing communication between the satellite positioning device as the base station and the plurality of satellite positioning devices as the rover stations, each of the satellite positioning devices, comprising:
a satellite positioning part for receiving radio waves from a satellite;
a communication part for performing communication between each of the satellite positioning devices; and
a control part for controlling the satellite positioning part and the communication part, the control part of each of the satellite positioning devices, including:
a rover station function executing program which executes a rover station function; and
a base station function executing program which executes a base station function,
the control part of each of the satellite positioning devices being configured to switch between the rover station function and the base station function, wherein each of the communication parts has a specific ID assigned for each of the satellite positioning devices, wherein the server includes the specific ID of each of the communication parts registered for each of the satellite positioning devices, and wherein the server verifies the specific ID registered in the server and the specific ID registered in each of the satellite positioning devices, and allows login to the IP-VPN communication network, so as to establish the communication between the satellite positioning device as the rover station and the satellite positioning device as the base station.

2. The RTK-GPS surveying system according to claim 1, wherein a plurality of specific IDs of the satellite positioning devices as the base stations is registered in the server, the control part of each of the satellite positioning devices as the rover station includes a selection device configured to select the specific ID of the satellite positioning device used as the fixed device, and one of the satellite positioning devices as the fixed device is selectable by an operation of the control part from the satellite positioning device as the rover station.

3. The RTK-GPS surveying system according to claim 2, wherein the satellite positioning devices including the base station and the rover station are adopted as a group, the control part of each of the satellite positioning devices includes the specific ID of another satellite positioning device belonging to the group, and the control part of each of the satellite positioning devices is communicable within a range of the group.

4. The RTK-GPS surveying system according to claim 1, wherein a plurality of satellite positioning devices used as the rover stations is provided in the IP-VPN communication network, the control part of one of the satellite positioning devices used as the rover station includes an instruction portion for sending an instruction from a beginning to an end of observation to another rover station and the control part of the another rover station includes an alarm portion for informing the instruction from the instruction portion, so as to perform surveying by means of an indirect observation method which performs simultaneous measurement by using at least two satellite positioning devices used as the rover stations.

5. The RTK-GPS surveying system according to claim 1, wherein the control part of each of the satellite positioning devices includes firmware for executing a function of the control part, the IP-VPN communication network includes a central terminal device configured to update the function of the control part, and each of the satellite positioning devices accesses the central terminal device, so as to update the firmware online.

6. The RTK-GPS surveying system according to claim 5, wherein each of the satellite positioning devices is accessible to the central terminal device via the server.

7. The RTK-GPS surveying system according to claim 1, wherein the IP-VPN communication network includes a central analysis process device configured to analyze data obtained by each of the satellite positioning devices online.

8. The RTK-GPS surveying system according to claim 7, wherein a specific ID of the central analysis process device is registered in the server, and each of the satellite positioning devices establishes communication with the central analysis process device via the server.

* * * * *